(12) United States Patent
Okada et al.

(10) Patent No.: US 6,425,723 B1
(45) Date of Patent: Jul. 30, 2002

(54) LOADING DEVICE

(75) Inventors: Tomoyuki Okada; Yuji Kato; Hirofumi Saito; Takahisa Miyamoto, all of Inagi; Kenichi Utsumi, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/535,021

(22) Filed: Mar. 24, 2000

(30) Foreign Application Priority Data

Aug. 4, 1999 (JP) ............................................. 11-221339

(51) Int. Cl.⁷ ................................................. B65G 1/02
(52) U.S. Cl. ........................ 414/277; 414/278; 414/280; 360/92
(58) Field of Search ............................ 360/92; 414/277, 414/278, 280

(56) References Cited

U.S. PATENT DOCUMENTS

| | | | | |
|---|---|---|---|---|
| 4,856,956 A | * | 8/1989 | Zur | 414/280 |
| 5,442,500 A | * | 8/1995 | Hidano et al. | 360/22 |
| 5,537,268 A | * | 7/1996 | Felde et al. | 360/92 |
| 5,936,795 A | * | 8/1999 | Theobald et al. | 360/92 |
| 5,999,500 A | * | 12/1999 | Mueller | 360/92 X |

* cited by examiner

Primary Examiner—Steven A. Bratlie
(74) Attorney, Agent, or Firm—Greer, Burns & Crain, Ltd.

(57) ABSTRACT

In order to achieve a magazine structure in which any necessary cartridge can be removed or inserted while a magazine is mounted in an autoloading device, a carrier unit is equipped with a lock releasing mechanism at the distal ends of openable/closable arms thereof so that a cartridge received in the magazine may be individually released from locking. This prevents any failure on the reading and writing of data due to removal of any wrong cartridge since the cartridge to be released can be defined by a programmable operation of the carrier unit.

3 Claims, 7 Drawing Sheets

LOADING DEVICE

BACKGROUND OF THE INVENTION

1. Field of the Invention

The present invention relates to a technique effectively applied to a magazine to be mounted in a cartridge autoloading device for a magnetic tape drive unit.

2. Description of the Related Art

Cartridges having magnetic tapes wound and accommodated therein are generally used as external storage for a host computer, and a cartridge autoloading device in which the cartridges are accommodated several-by-several in a magazine and are inserted/ejected to the drive unit from the magazine by using a carrier unit to load these cartridges into a drive unit is well known.

In this type of cartridge autoloading device, after several cartridges have been accommodated in a magazine outside the autoloading device, the device door is opened to mount the magazine thereinto. Thereafter, until all the processing on the cartridges received in the magazine is completed, the cartridge itself cannot be removed from the autoloading device.

Therefore, if a user desires to replace any of the cartridges received in the magazine, he must wait for the completion of all of the processing of the magazine. This will not improve the processing efficiency.

The present invention has been made in view of the above-stated problems, and its object is to provide a magazine structure from and into which a necessary cartridge can be removed and inserted while the magazine is mounted in an autoloading device.

SUMMARY OF THE INVENTION

The present invention provides a loading device comprising: a magazine capable of accommodating a cartridge in stacked tiers, the magazine having cartridge locking means provided at each tier for regulating the back-and-forth movement of the cartridge; and a carrier unit disposed at the rear of the cartridge, the carrier unit having a pair of guide means.

Since the magazine has cartridg[0085] locking means at each tier, the removing/loading operation from/into the magazine is permissible on the cartridge basis while unloaded cartridge may not be carelessly removed. Further, the lock mechanism is operated with a guide arm of a carrier mechanism such as a carrier unit in the loading device, so that the locked state of the cartridge can be released by opening/closing the guide arm of the existing carrier unit.

DETAILED DESCRIPTION OF THE PREFERRED EMBODIMENT

The preferred embodiment of the present intention will now be described with reference to the accompanying drawings.

A loading device in accordance with the present embodiment is intended to load a cartridge 3 having a wound magnetic tape (not shown) received therein into a drive unit 9.

Figure 1:
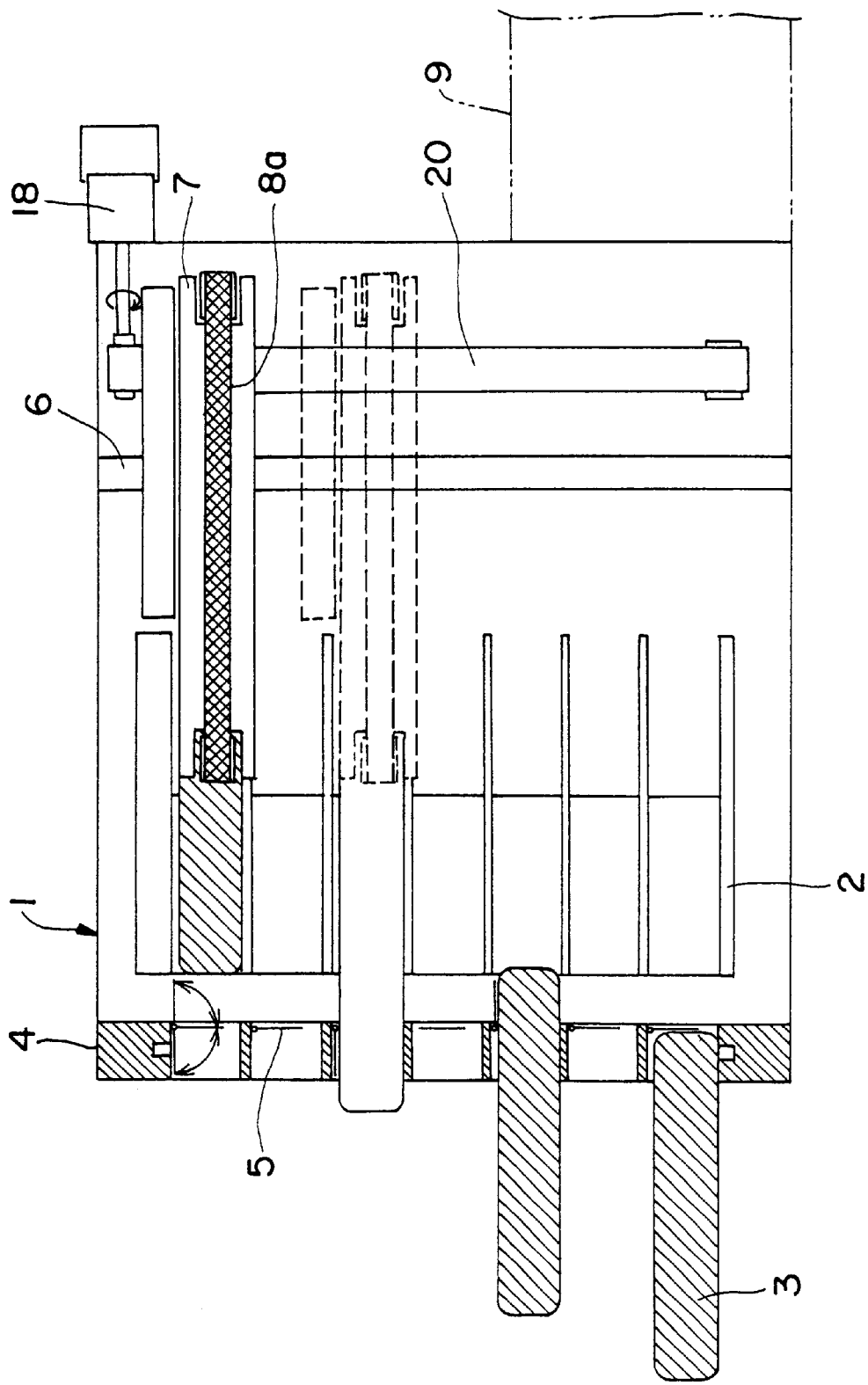
FIG. 1 is a diagram for explaining an internal structure of an autoloading device in accordance with an embodiment of the present invention.

Referring to FIG. 1, the loading device is made up of a loading device body 1 and a door element 4, and the loading device body 1 is loaded with a magazine 2 constructed in tiers (seven-tiers in the present embodiment). A cartridge 3 can be horizontally accommodated in the magazine 2 at each tier.

A carrier unit 7 that is guided by a guide rail 6 and is able to elevate/lower is disposed between the magazine 2 and the drive unit 9. The carrier unit 7 can be elevated/lowered by a belt 20 that is moved up and down by means of an elevation/lowering motor 18. The operation of the carrier unit 7 and the elevation/lowering motor 18 is controlled by a control unit (not shown), and may be programmed in advance, for example, by using an operational panel 12.

The magazine 2 is opened at the front and rear sides thereof in the horizontal direction, and the cartridge 3 can be inserted into the front side (the left side in FIG. 1) and retracted into the carrier unit positioned in the rear side (the right side in FIG. 1).

The door element 4 includes suspended window elements 5, and the lower end of each window element 5 is pulled forward or pushed rearward to open the window element 5 from which the cartridge 3 received in the magazine 2 can be removed.

Figure 2:
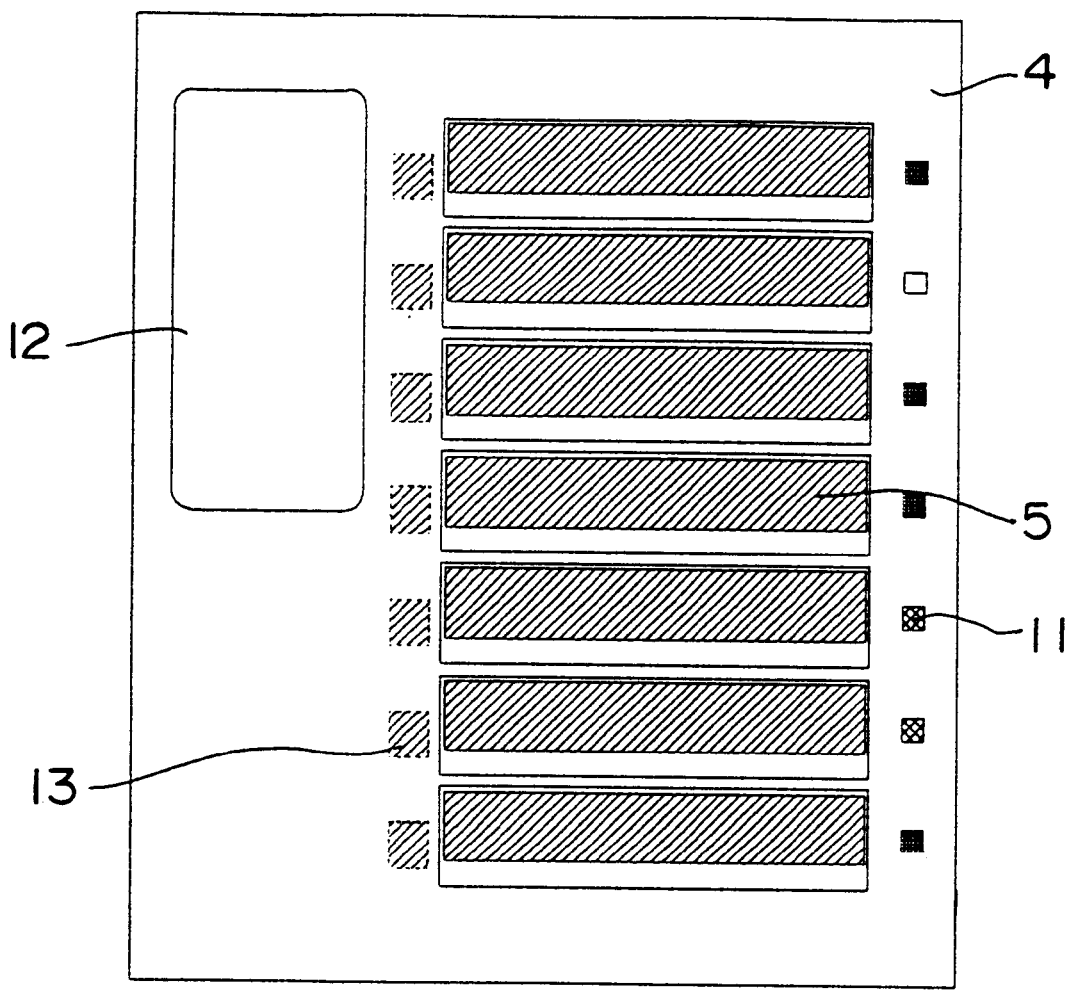
FIG. 2 is an external view at a door element side of the autoloading device in accordance with the embodiment.

FIG. 2. is a front view of the door element 4. The door element 4 includes an operational panel 12 through which an operator can program the order of loading the cartridges into the drive unit 9, etc.

The door element 4 also includes replaceable lamps 11 made of an LED etc. at each tier so that it can be viewed whether or not the cartridge 3 is replaceable in response to the lighting condition. For example, the lamp 11 at the tier where the cartridge 3 that has been read and written in the drive unit 9 is accommodated is lighted with green indicating the replaceability.

The window element 5 can be manually opened by an operator to replace the a cartridge 3. However, if a cartridge 3 that has not been processed by the drive unit 9 is removed from the magazine 2, the order of the cartridges 3 will be inconsistent. Accordingly, a lock mechanism 13 may be used to prevent the window element 5 from being opened at the tier which holds the cartridge that should not be replaced. The lock mechanism 13 of the window element 5 will be described later with reference to FIG. 7.

Figure 3:
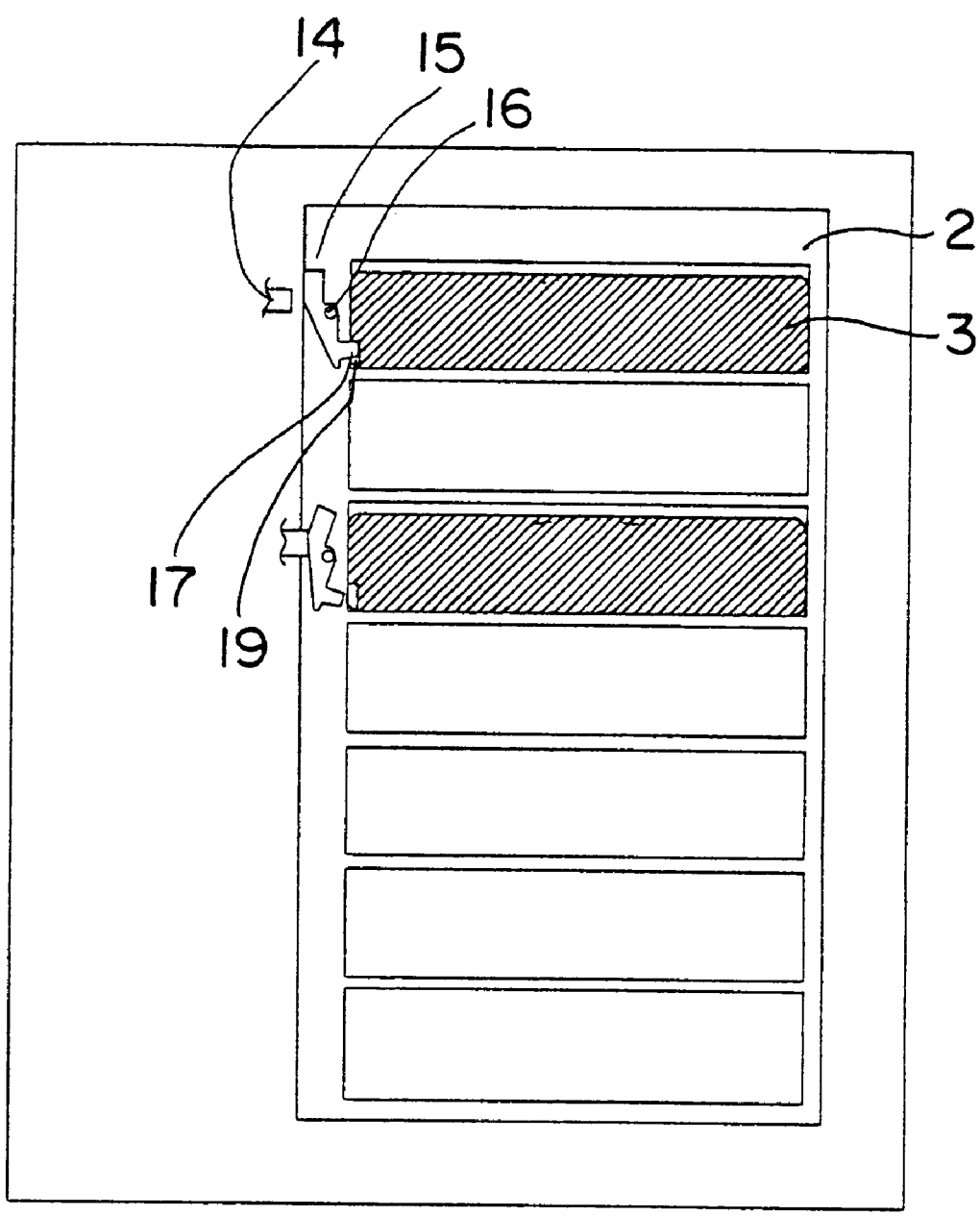
FIG. 3 is an explanatory diagram showing a cartridge locking mechanism of the autoloading device in accordance with the embodiment of the present invention.

FIG. 3 shows the magazine 2 which accommodates the cartridges when the door element 4 is open. As shown in this figure, a locking arm 15 at each tier is provided at one side of the magazine 2. The locking arm 15 can be rotated about a pivot portion 16, and one end of the arm is engaged with a locking hole 19 formed in the cartridge 3 so as to prevent the cartridge 3 from moving forward and backward. The locking arm 15 is pressed by a releasing arm 14 in the right direction of the figure to release the engagement relation with the cartridge 3.

Figure 4:
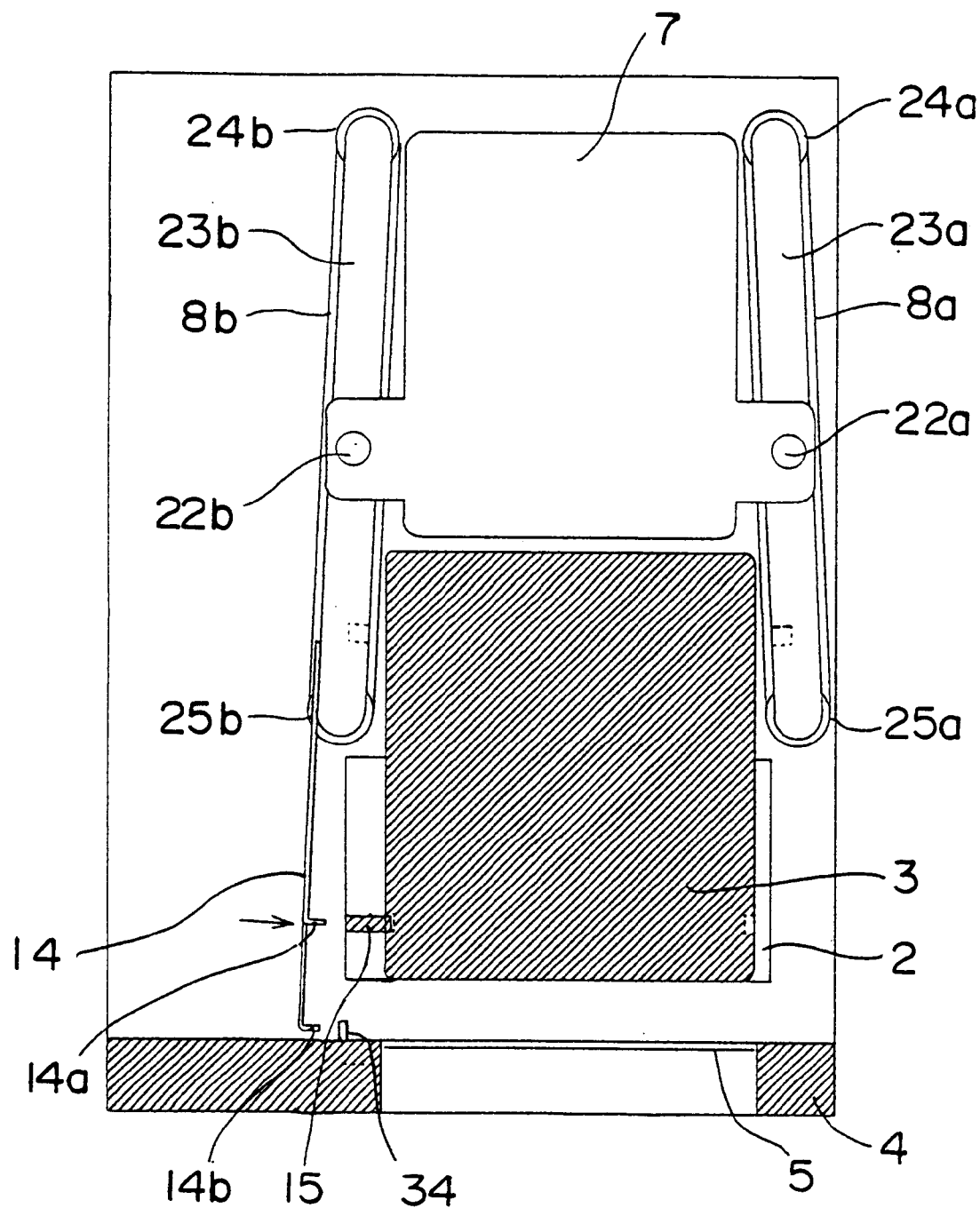
FIG. 4 is a first diagram showing the operation of ejecting a cartridge by a carrier unit in the autoloading device in accordance with the embodiment of the present invention.
Figure 5:
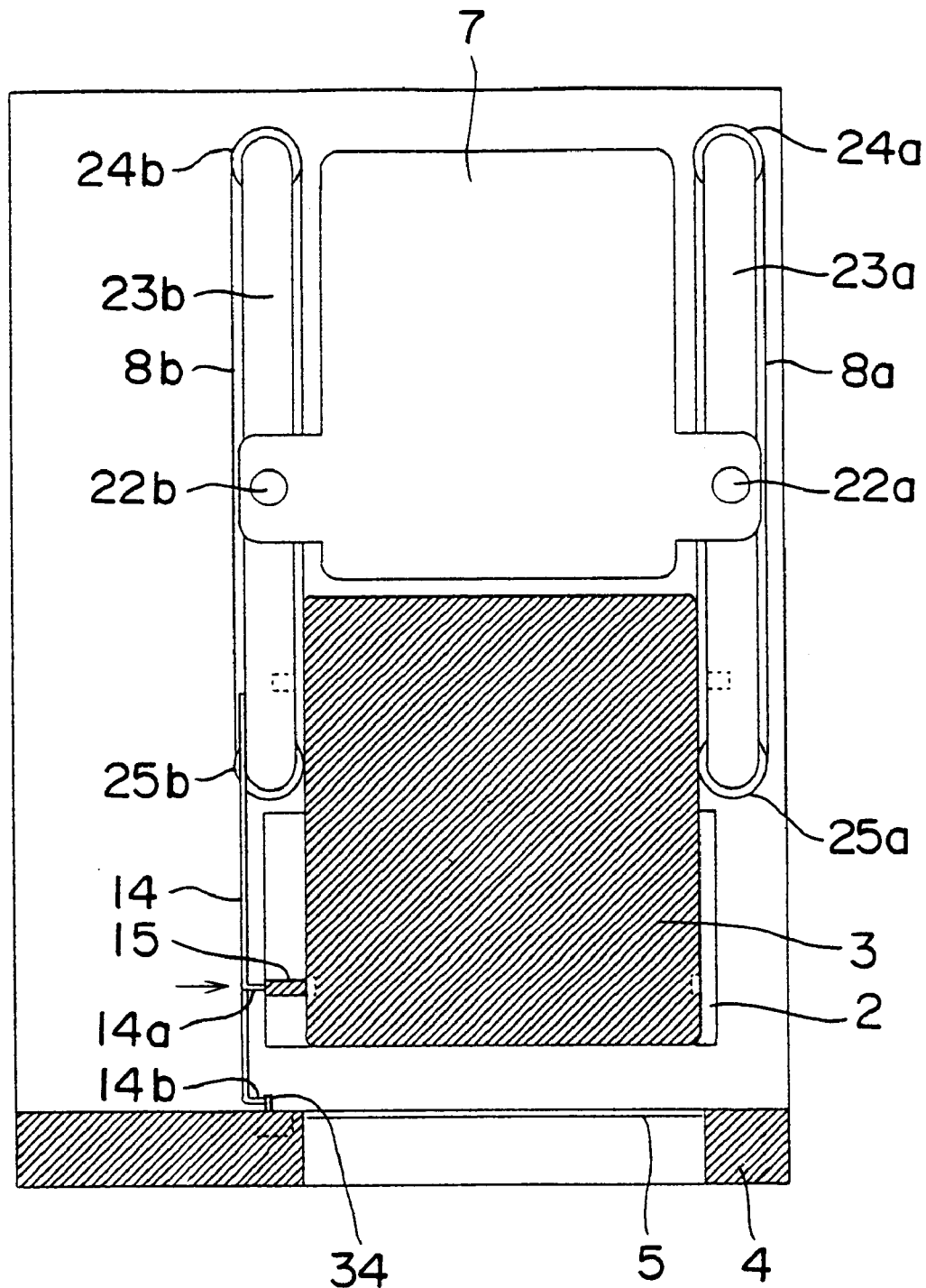
FIG. 5 is a second diagram showing the operation of ejecting a cartridge by a carrier unit in the autoloading device in accordance with the embodiment of the present invention.
Figure 6:
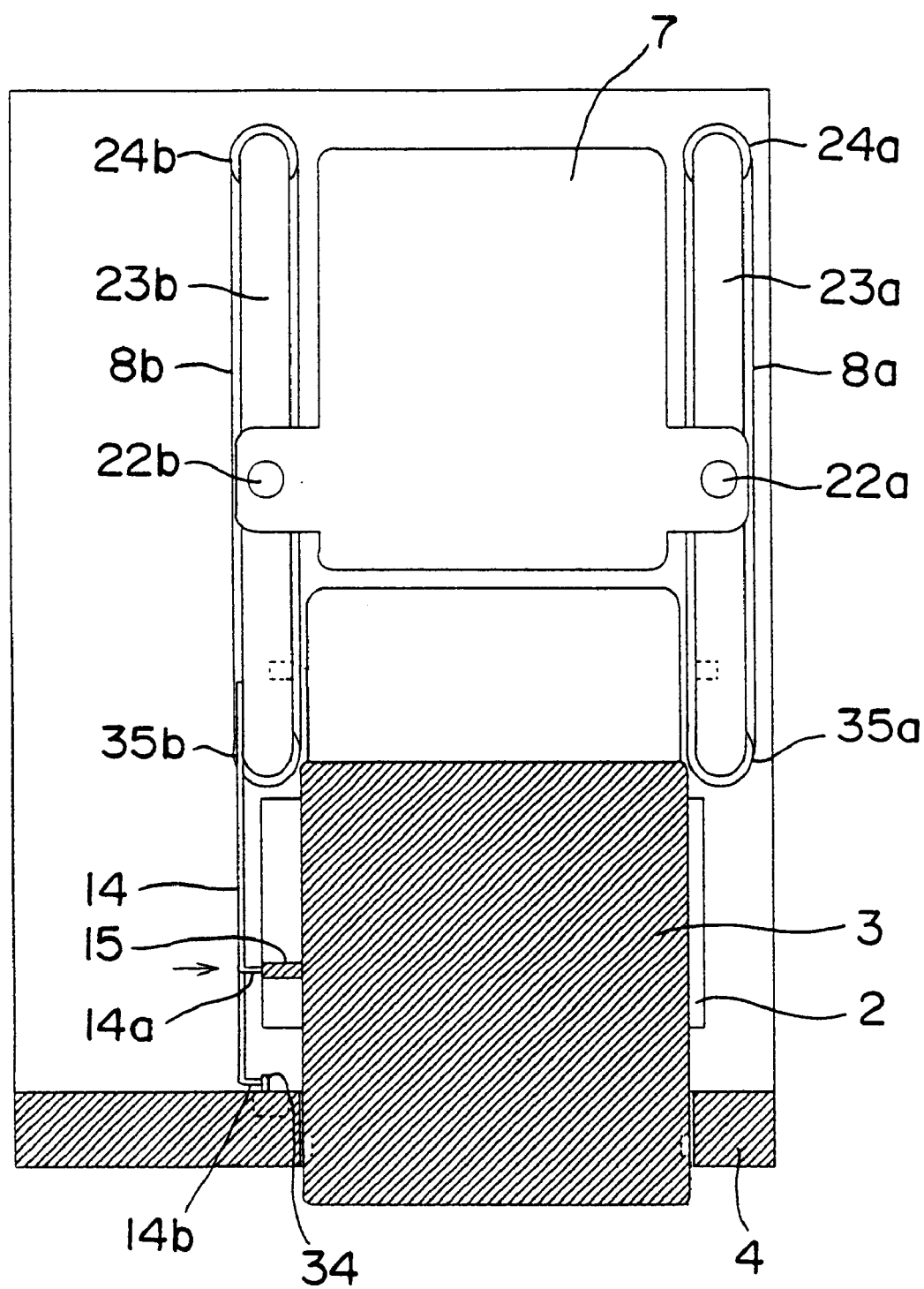
FIG. 6 is a third diagram showing the operation of ejecting a cartridge by a carrier unit in the autoloading device in accordance with the embodiment of the present invention.

FIGS. 4 to 6 are plan views for explaining the operation of the carrier unit 7.

The carrier unit 7 is disposed at the rear of the cartridge 3 in the magazine 2, and includes a pair of guide arms 23a and 23b that are rotatable about pivot portions 22a and 22b, which are positioned at the outer edges. Guide rollers 24a and 25a, and 24b and 25b are mounted to the ends of the guide arms 23a and 23b, respectively, and belts 8a and 8b are suspended between the respective guide rollers (i.e., 24a and 25a, and 24b and 25b). A motor (not shown) can urge these guide arms 23a and 23b to perform the opening/closing operations. In FIG. 4, the guide arms 23a and 23b are made to be opened toward the cartridge 3 (i.e., the forward side). The guide rollers 25a and 25b include motors (not shown) so that the belts 8a and 8b may be rotated thereby. The rotation of the belts 8a and 8b allows the cartridge 3 to be retracted in the direction of the trailing edge of the carrier unit 7 (upwardly, as shown in FIG. 4) and to be ejected forward (downwardly, as shown in FIG. 4).

One guide arm 23b includes a releasing arm 14 extending forward from the guide arm 23b, and the releasing arm 14 is bent into an L-shape at the intermediate part so as to face the side surface of the cartridge 3. The distal end 14a of the releasing arm 14 is brought into contact with the proximal portion of the locking arm 15, as shown in FIG. 3. More specifically, when the guide arm 23b of the carrier unit 7 is made to close rather than to open, the releasing arm 14 is also rotated counterclockwise about the pivot portion 22bso that the distal end 14a thereof is brought into contact with the proximal portion of the locking arm 15. When a pressing force is applied to the distal end of the releasing arm 14, the proximal portion of the locking arm 15 is rotated clockwise about the pivot portion 16 so that a locking claw 17 is retracted to release the locked state of the cartridge 3.

Figure 7:
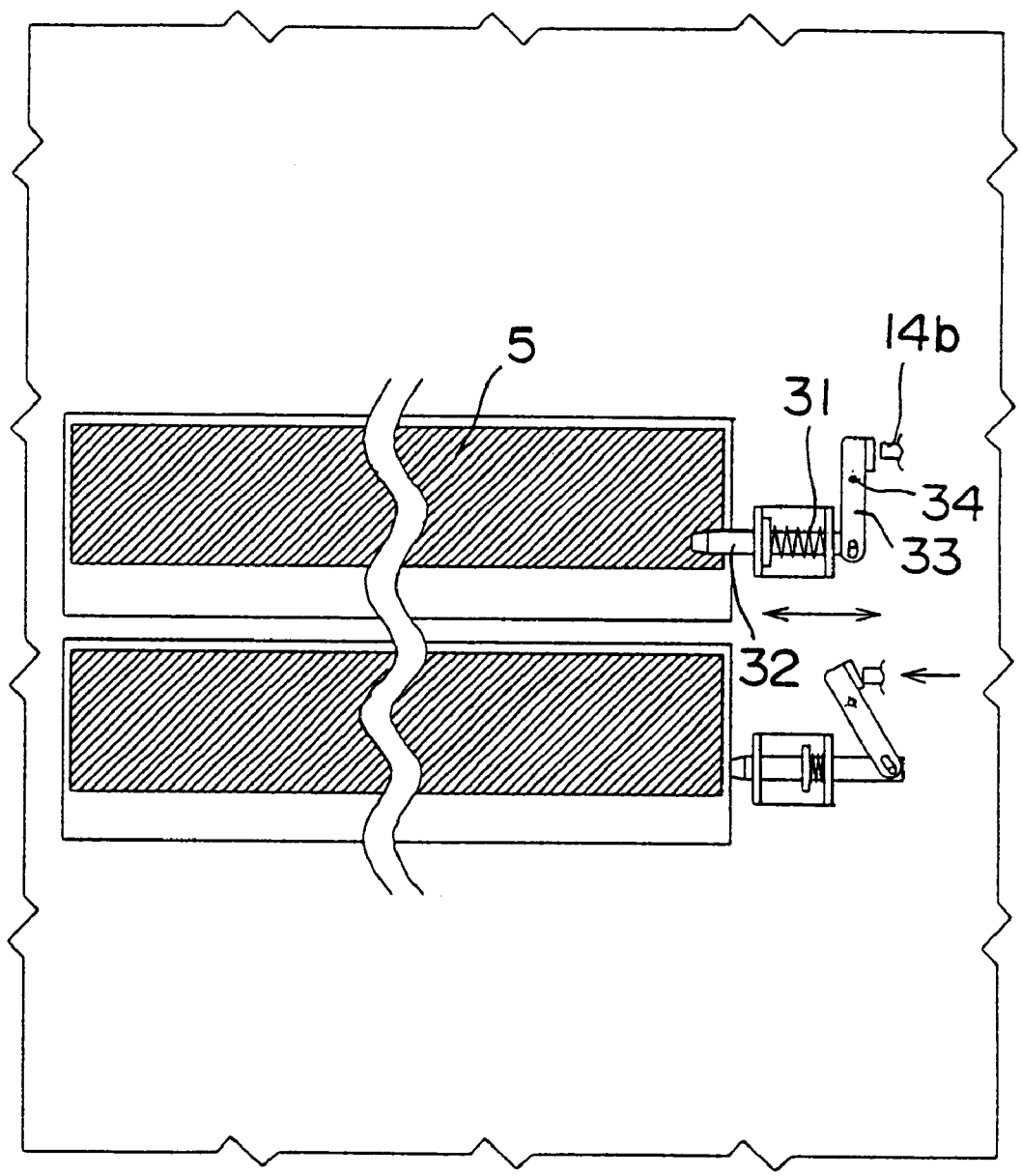
FIG. 7 is an explanatory diagram showing a lock mechanism of a window element in accordance with the present embodiment.

A further distal end 14b of the releasing arm 14 is also bent into an L-shape so that a lock mechanism of the window element 5 may be actuated and released, as shown in FIG. 7.

FIG. 7 shows the window element 5 as viewed from the back (the side of the magazine 2). A window lock pin 32 projected from the window element 5 in a normal state is mounted to a side of the window element 5, and the pin is biased by a compression spring 31 to regulate the opening/closing of the window element 5. The proximal portion of the window lock pin 32 is engaged with an end of a window lock arm 33, allowing the window lock arm 33 to be rotated about a pivot portion 34. The other end of the window lock arm 33 may contact the distal end 14b of the releasing arm 14 such that the closing operation of the releasing arm 14 causes the distal end 14b to press the other end of the window lock arm 33 to be operable to retract the window lock pin 32, thereby allowing the locked state of the window element 5 to be released.

An description will now be made of the procedure in which the locked state of the cartridge 3 is released to eject the cartridge to the outside from the window element 5.

First, under control of the elevating/lowering motor 18, the carrier unit 7 is elevated or lowered to the tier where the cartridge 3 to be ejected is accommodated, and then stopped. At this time, the guide arms 23a and 23b are made open as shown in FIG. 4.

Then, the carrier unit 7 makes the guide arms 23a and 23b close as shown in FIG. 5. At this time, the releasing arm 14 is also rotated clockwise about the pivot portion 22b so that the distal end 14a thereof actuates the locking arm 15 shown in FIG. 3 to retract the locking claw 17 from the lock hole 19. At this time, as described with reference to FIG. 7, the distal end 14b of the releasing arm 14 also actuates the window locking arm 33 to release the locked state of the window element 5. Therefore, the cartridge 3 and the window element 5 can be released from locking.

Subsequently, the carrier unit 7 allows the guide rollers 25a and 25b to be rotated, and actuates the guide belts 8a and 8b to eject the cartridge 3 held therebetween outwardly (downwardly, as shown in FIG. 6). Since the locked state of the cartridge 3 and the locked state of the window element 5 have also been released in the above way, the cartridge 3 is projected from the window element 5 of the door element 4 so that an operator can remove the cartridge from the external.

As described above, according to the present embodiment, the carrier unit is used to control the locked and released states of the cartridge. Since this operation of the carrier unit may be programmed in advance, any necessary cartridge may be prevented from inadvertently being removed. Thus, cartridges that have been processed may be identified, and their locked states may be released to facilitate their replacement.

While the carrier unit has been described in the present embodiment in which the locked state of the cartridge is released tier-by-tier, a serrated operational arm may be disposed at one side of the magazine, by which all cartridges received in the magazine may be released from their locked states at the same time.

What is claimed is:

1. A loading device comprising:

a magazine capable of accommodating a cartridge in stacked tiers, said magazine having a cartridge locking means provided at each tier for regulating the back-and-forth movement of the cartridge; and a carrier unit disposed at the rear of the cartridge, said carrier unit having a pair of guide means;

wherein said pair of guide means is formed of a pair of guide belts capable of being opened and closed around the cartridge and said cartridge locking means being interlocked with the opening and closing operation of said pair of guide belts.

2. A loading device as claimed in claim 1, wherein said cartridge locking means extends toward the cartridge from guide arms having said pair of guide belts held thereon, and a lock pin engaged with a lock hole formed in a side surface of the cartridge is pressed and repelled by means of the opening and closing operations.

3. A loading device as claimed in claim 2, wherein said loading device includes a window element forward of each cartridge, capable of allowing removal of the cartridge tier-by-tier, so that said window element is locked or released by means of the opening and closing operations of the guide arms.

* * * * *